United States Patent [19]

Goldmeier

[11] Patent Number: 4,730,840
[45] Date of Patent: Mar. 15, 1988

[54] MINIATURE FRONT WHEEL DRIVE BICYCLE FOR CHILD

[75] Inventor: Steven Goldmeier, Old Bethpage, N.Y.

[73] Assignee: Rand International, Farmingdale, N.Y.

[21] Appl. No.: 50,503

[22] Filed: May 14, 1987

[51] Int. Cl.[4] .................. B62H 1/12; B62J 7/04; B62K 3/06
[52] U.S. Cl. .................. 280/210; 280/281 R; 280/293; D12/111
[58] Field of Search ............. 280/210, 211, 216, 220, 280/203, 208, 259, 270, 281, 282, 293; D12/111, 112

[56] References Cited

U.S. PATENT DOCUMENTS

| D. 217,525 | 5/1970 | Takashima | D12/111 |
| D. 220,600 | 4/1971 | Hill | D12/111 |
| 3,294,416 | 12/1966 | Carnielli | 280/278 |
| 3,642,305 | 2/1972 | Pawsat | 280/293 |

FOREIGN PATENT DOCUMENTS 3034724  4/1982  Fed. Rep. of Germany ...... 280/293

Primary Examiner—John J. Love
Assistant Examiner—Mitchell J. Hill
Attorney, Agent, or Firm—Kuhn and Muller

[57] ABSTRACT

A small size bicycle for use by young children having front wheel pedal drive and adapted to have an attached training wheel assembly.

10 Claims, 8 Drawing Figures

MINIATURE FRONT WHEEL DRIVE BICYCLE FOR CHILD

FIELD OF THE INVENTION

This invention is directed to a small size bicycle, approximately ten inches high, which is usable by children aged 1½ to 3 years. More particularly, the present invention is directed to a small size bicycle having a front wheel direct drive, being of sturdy, lightweight, comfortable construction and being readily adapted to be provided with a very stable training wheel assembly.

BACKGROUND OF THE INVENTION

Bicycles have long been used for recreation and, more recently, relatively small sized front wheel drive sidewalk bicycles have been developed for young children. These sidewalk bicycles have not been fully satisfactory for very young children, aged 1½ to 3 years old, since these sidewalk bicycles are generally a bit too large, too heavy and too stiff, i.e. too sensitive to minor shocks from hard, rough surfaces, for comfortable use by very young children. Merely reducing the overall size of prior art sidewalk bicycles can achieve same weight reduction but the prior art configurations are not adapted to substantial size reduction on account of a usual elaborateness of design.

SUMMARY OF THE INVENTION AND OBJECTS

A principal object of this invention therefore is to provide a two-wheel bicycle having a configuration which permits the bicycle to be made in a very small size while providing a device which is lightweight, comfortable and stable and which can be easily operated by small children, e.g. aged 1½ to 3 years.

These and other objects will be apparent to those skilled in the art from the following description taken in conjunction with the drawing wherein:

DESCRIPTION OF THE PREFERRED EMBODIMENTS

Figure 1:
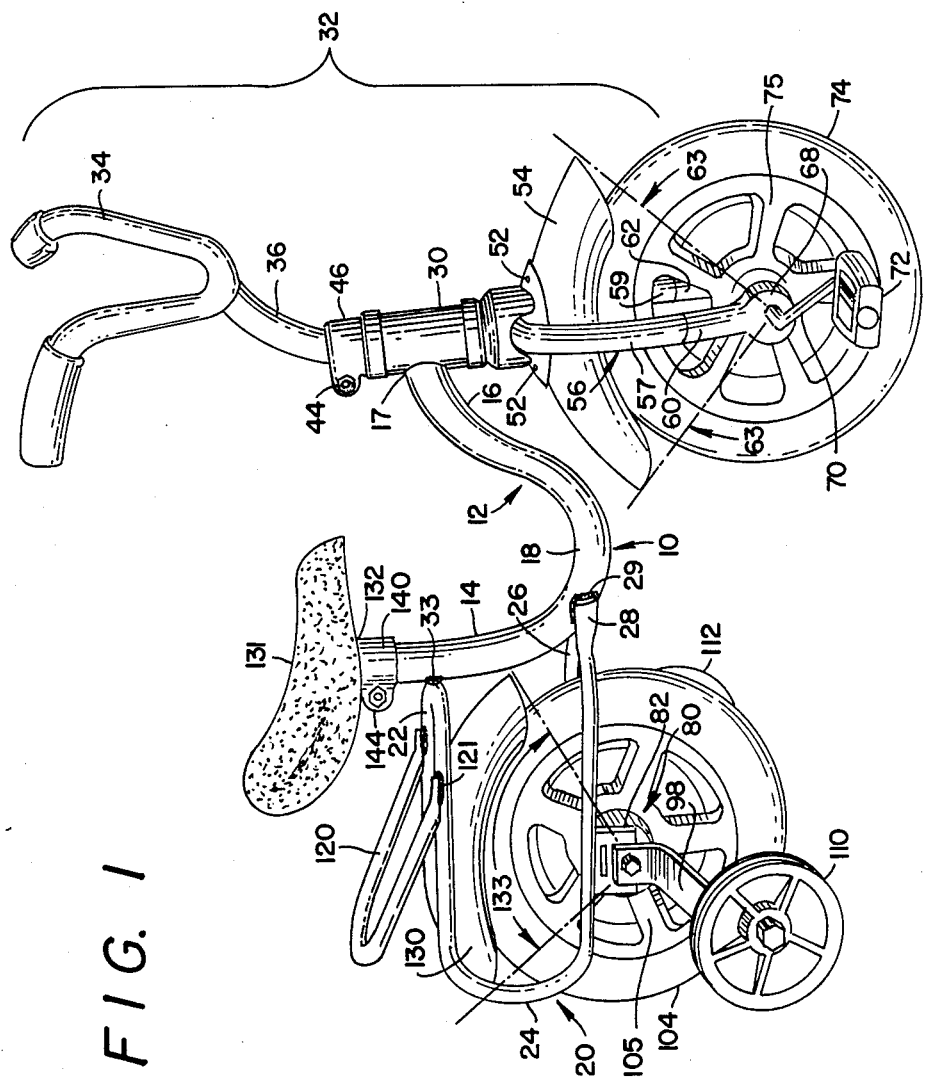
FIG. 1 is an assembly view of a particular embodiment of a bicycle in accordance with the present invention.

With reference to the drawing, FIG. 1 shows a bicycle in accordance with present invention comprising a tubular metal frame 10, e.g. suitably made of steel tube, having a goose-neck shape midsection 12 which comprises, in the embodiment illustrated, a generally straight portion 14, an inclined generally "C"-shaped forward portion 16 and a bow-shaped portion 18 intermediate the straight and "C"-shaped portions with bow-shaped portion 18 curving in a direction opposite to the "C"-shaped portion 16. The length of the straight portion 14 is about one-half the diameter of the "same-sized" front and rear wheels 74 and 104. In the embodiment illustrated, the midsection 12 is integral, i.e. unitary in that it is formed by mechanical deformation of a single piece of metal tube to provide a shape having smoothly curved bends which impart a significant degree of resilience or springiness to the metal frame and dampen shocks which may occur due to uneven terrain. The span of midsection 12 from the straight section 14 to the end of "C"-shaped portion 16 is selected so that a young child aged 1½ to 3 years old can reach the pedals at all degrees of rotation.

Figure 2A:
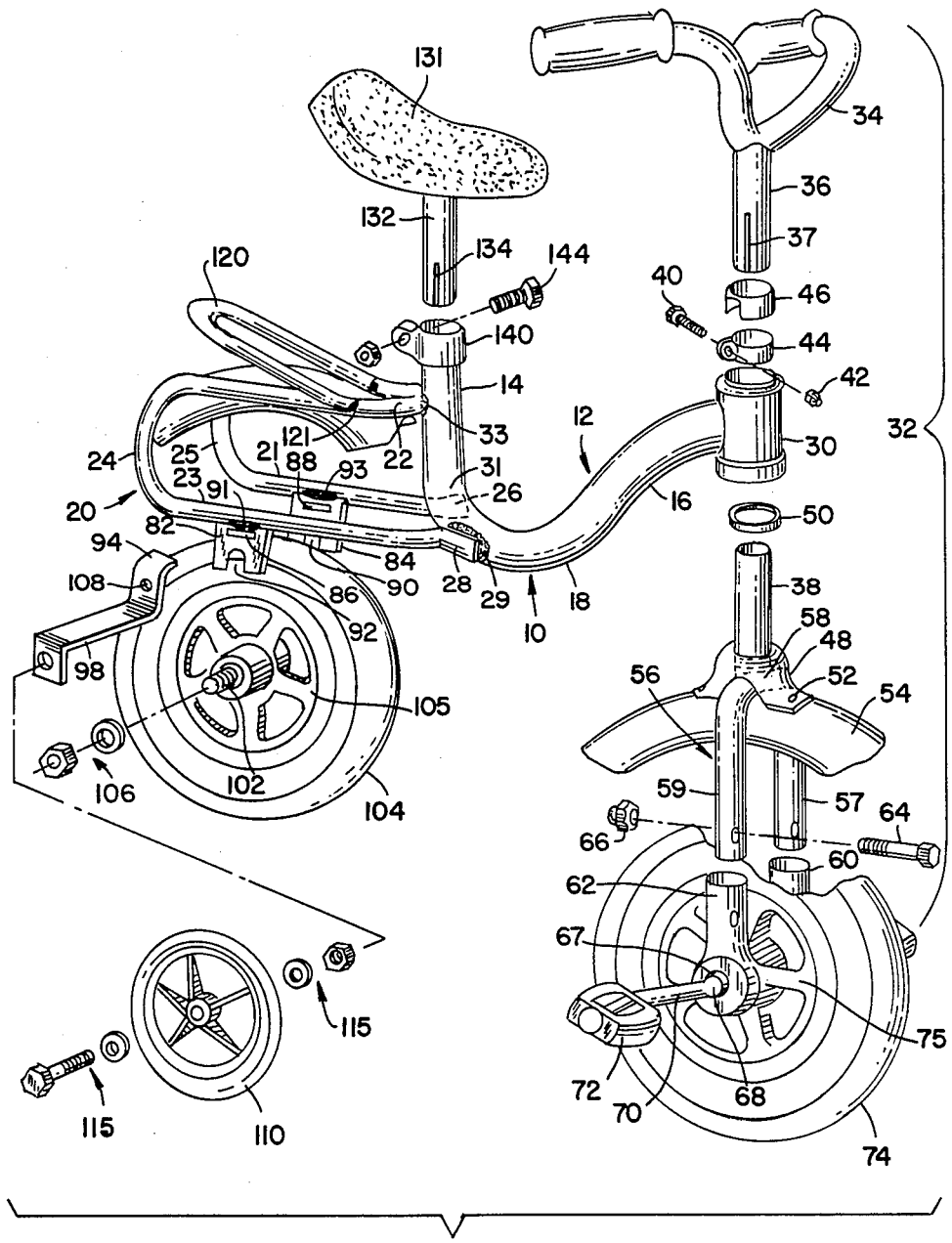
FIG. 2(a) is a detailed exploded view of a bicycle of the type shown in FIG. 1.
Figure 3D:
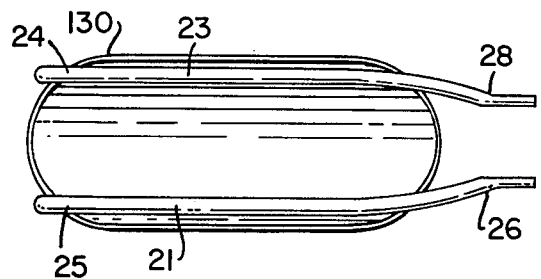
FIGS. 3(a)-(e) show plan and elevation views of the rear section of the frame of a bicycle of the type shown in FIG. 1.
Figure 3E:
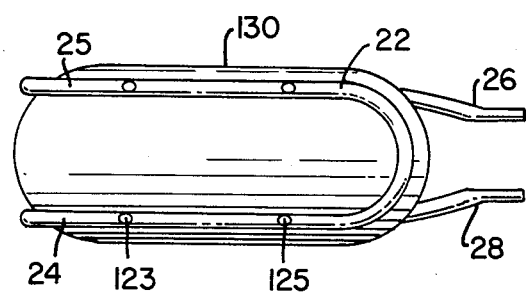
Figure 2B:
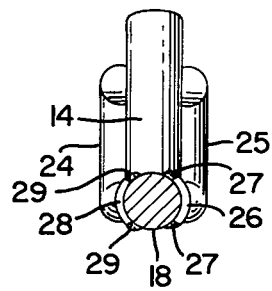
FIG. 2(b) shows in some detail a particular nesting connection on the frame of the bicycle of FIG. 1.
Figure 3A:
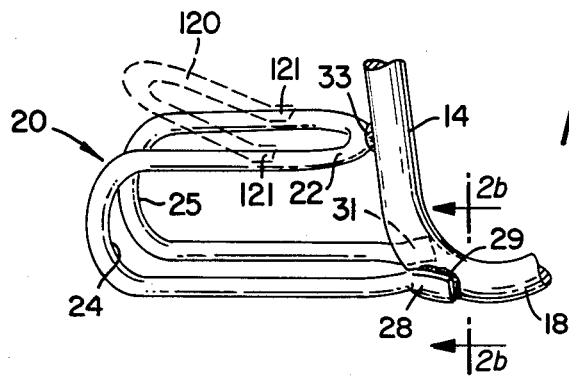
Figure 3B:
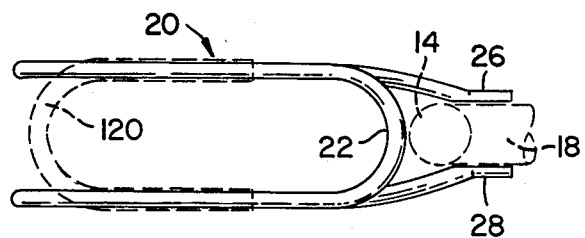
Figure 3C:
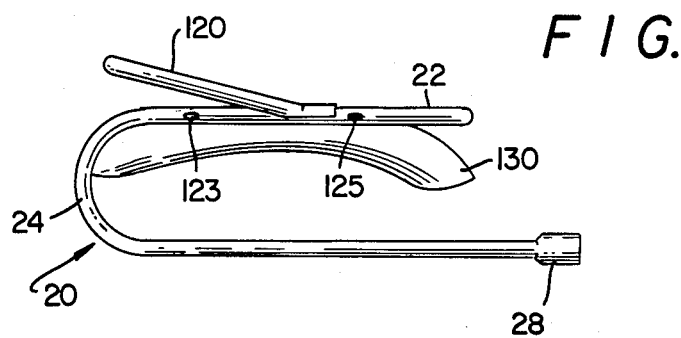

With particular reference to FIGS. 3(a), 3(b), and 3(c), the rear section 20 is a metal tube, suitably of about one-half the diameter of the tube of the midsection 12, and has a configuration formed by bending the metal tube in double at 22 in a first plane, and bending it again in a direction which is about at a right angle to the first plane to provide a tube configuration having, with reference to FIGS. 3(a), 3(b), and 3(c), a "U"-shape 22 when viewed from the top and "U"-shapes 24, 25 in planes substantially parallel to each other, and substantially perpendicular to the plane of "U"-shape 22 when viewed from either side. The aforedescribed bending is accomplished in a manner to avoid any creasing or crimping of the metal tube so as to result in smooth arcuate bends. The end portions 26, 28 of parallel extensions 21, 23 of the tubular rear section 20 are subjected to mechanical deformation so as to be shaped to conform to the cylindrical periphery of the lower portion of the bow-shaped portion 18, which as shown particularly in FIGS. 2(b) and 3(a), nests in the conforming configuration 27 established by the deformation of end portions 26, 28 and to which extensions 26, 28 are affixed, e.g. by brazing or welding at 29, 31. This nesting support engagement of bow-shaped portion 18 with extensions 26, 28, enhances the resilience of tubular metal frame 10. As shown in FIG. 2, the "U"-shaped portion 22 is positioned closely adjacent the upwardly extending portion 14 of midsection 12 to which it is fixedly attached at 33 e.g. by brazing or welding. The forward section of frame 10 is a cylindrically shaped head tube 30 which is fixedly attached, e.g. by brazing or welding at 17 to the end of "C"-shaped portion 16 which is remote from the straight portion 14.

A steerable assembly 32 is engaged to head tube 30 and comprises a handle bar 34, suitably made of steel tube fixedly mounted on handle bar stem 36, also suitably made of steel. Handle bar stem 36, which is split as shown at 37 in FIG. 2(a), passes through head tube 30 and telescopically surrounds fork neck 38 and is fixed thereto by adjustment of bolt 40 and nut 42 of clamp 44; clamp 44 is covered by a clamp cover 46. Head tube 30 is spaced from fork cover flange 48 by plastic washer 50 and flange 48, which is fixed to fork neck 38 by metal rivets is attached e.g. by rivets 52 to front fender 54, which is suitably made of steel sheet. In the preferred embodiment shown in the drawing, front fender 54, suitably made of a rigid thermoplastic resin such as polyvinylchloride (PVC) has a curved, concave shape, of arcuate cross-section, which slightly overlaps front tire 74 and extends between about one to one and one-half quadrants, as indicated at 63 in FIG. 1, above front wheel axle 68. Front fender 54 is fixed to flange 48 as described above and extends about equally to the front and rear of flange 48. The shape and location of front fender 54 provides optimized protection to the rider while not overly encumbering the bicycle. Fork 56 and fork neck 38, both suitably made of steel tubing, are fixedly joined by a clamp at 58. Fork branches 57, 59 fit telescopically within fork sleeves 60, 62 and are fixedly attached thereto by means of bolts 64, and nuts 66. Sleeves 60, 62 suitable made of metal sheet are rotatably engaged at 67, through a suitable bearing arrangement, to front wheel axle 68 which is integrally connected to oppositely extending, radial pedal shafts 70, which support pedals 72. Front tire 74, suitably made of ethylene vinyl acetate (EVA), is mounted on wheel 75, suitably made of fiber-reinforced nylon, and wheel 75 is fixed to axle 68 by press fitting, and is driven directly from pedals 72.

A rear wheel assembly, indicated at 80, comprises metal tabs 82, 84 attached to parallel extensions 21, 23 of tubular rear section 20, e.g. by brazing or welding as indicated at 91, 93. Metal tabs 82, 84 are parallel and extend downwardly away from upwardly extending portion 14 of mid-section 12 and are slotted at 86, 88 and notched at 90, 92. Slots 86, 88 receive the extensions 94 of symmetically arranged training wheel brackets 98. Notches 90, 92 rotatably engage axle 102 of rear wheel 104. Axle 102 is fixedly attached to rear wheel 104, e.g. by press fitting and is held in place, together with bracket pair 98, by nut and washer arrangements 106. Apertures 108 in the brackets 98, closely surround axle 102 and, together with bracket extensions 94, maintain bracket pair 98 in a fixed position which enables symmetrically arranged training wheels 110, 112, when fixed to bracket pair 98 by nut and bolt arrangement, to have their contact bearing surfaces in the same plane as that of front wheel 74 and rear wheel 104.

A "U"-shaped tubular member 120 is fixedly attached to upper "U"-shaped portion 22, e.g. at 121 by brazing or welding as particularly illustrated in FIG. 3(a). "U"-shaped member 120 is at an upward angle with "U"-shaped portion 22 so that it can serve as a package holder or a push bar for the bicycle. Rear fender 130, suitably made of a thermoplastic resin such as polyvinylcholoride, PVC, is fixedly attached to tubular rear section 20, suitably with rivets as indicated at 123, 125 in FIG. 3(c). In the preferred embodiment shown in the drawing, rear fender 130 has a curved, concave shape, of arcuate cross-section, which slightly overlaps rear tire 104, suitably made by EVA and which extends about one to one and one-half quadrants, as indicated at 133 in FIG. 1, above rear wheel axle 102. Rear wheel axle 102 is press fitted onto rear wheel 105. Rear fender 130, is located below the first "U"-shaped bend 22 and nests in said "U"-shaped bend and is fixed thereto as described above. The shape and location of rear fender 130, suitably made of thermoplastic material provides optimized protection to the rider while not overly encumbering the bicycle. Seat 131, suitably made of steel, is fixedly mounted on seat post 132 and seat post 132 is split as shown at 134 in FIG. 2, and fits slidably within straight portion 14 of frame 10. The height of the seat is adjusted to the needs of the user and clamp 140, mounted on straight portion 14, is tightened by nut and bolt arrangement 144.

A particular advantage of the present invention is that its uncomplicated design enables the construction of a very small (e.g. 10 inches high) comfortable, stable and easily propelled forward drive bicycle. Other advantages are that the unitary metal tube frame member has a configuration which is resilient and absorbs the minor shocks due to rough terrain. Further the hollow goose-neck frame member together with the front wheel drive provides a stable arrangement which is also lightweight.

What is claimed is:

1. A miniature bicycle of a size suitable for children 1½ to 3 years old comprising: (A) an integral, tubular metal frame having (i) a midsection in the form of a unitary goose-neck shaped body tube, said goose-neck shaped body tube having an upwardly extending rear portion, an inclined forward portion and a bow-shaped midportion intermediate said rear and forward portions; (ii) a rear section in the form of a metal tube bent in double to provide (a) a first "U"-shaped bend extending in a first plane, and bent again to provide (b) a second and a third "U"-shaped bend extending in two separate substantially parallel planes which are substantially perpendicular to said first plane and (c) a pair of generally parallel terminal portions, each of said terminal portions being shaped to conform to the periphery of the bow-shaped portion of said integral tubular, metal frame and fixedly attached thereto by brazing or welding, and said first "U"-shaped bend being positioned adjacent the upwardly extending rear portion of said body tube and being affixed thereto by brazing or welding, (iii) a forward section in the form of a metal head tube being fixedly attached to said body tube by brazing or welding, said forward section being engaged to (B) a steerable front wheel assembly rotatably engaged with said head tube, said steerable assembly comprising (i) a handle bar connected to a handle bar stem (ii) a front wheel having an axle rotatably coupled to said handle bar stem and fixedly attached to pedal arms to enable front wheel drive, said rear section of said metal frame being engaged to (C)(i) a seat post slidably engaged with said upwardly extending rear portion of said body tube (ii) clamping means to fixedly attach said seat post to said rear portion of said goose-neck shaped body tube; and (D) said rear section of said metal frame being engaged to a rear wheel assembly comprising (i) a pair of training wheel metal brackets, each of said brackets being fixedly engaged to opposite sides of the rear section of the metal frame (ii) a pair of traning wheels, each of said wheels being rotatably engaged to an opposite bracket (iii) a rear wheel having an axle rotatably engaged to said rear section.

2. A bicycle in accordance with claim 1 wherein the rear portion of the midsection of the metal frame is substantially vertical and the inclined forward portion is deformed slightly upward at about its midposition to have a generally "C"-shape which curves oppositely to the intermediate bow-shaped section.

3. A bicycle in accordance with claim 1 wherein said rear wheel assembly is fixedly attached to said rear section of said metal frame and comprises (i) a first, slotted and apertured metal tab attched by welding or brazing to one of the parallel terminal portions of said rear section of the metal frame; (ii) a second, slotted metal tab attached by welding or brazing to the other said terminal portion of said rear section in a position opposite said first slotted metal tab, each of said metal tabs being spaced from the bow-shaped portion of the midsection of the metal frame and extending parallel to each other and away from the rear portion of said midsection, each of said metal tabs having a notch open at its lower edge; (iii) a rear wheel having a bearing mounted axle engaged with said open notches; (iv) a separate training wheel bracket engaged in the slot of each metal tab with its aperture slidably engaged with the axle of the rear wheel; (v) a training wheel rotatably engaged with each training wheel bracket; and (vi) means securing said brackets and metal tabs to said bearing mounted axle of said rear wheel.

4. A bicycle in accordance with claim 3 wherein a curved, concave rear fender of arcuate cross-section extends from about 1 to 1½ quadrants above the axle of the rear wheel and is located in nesting contact with and below the first "U"-shaped bend of the rear section of the metal frame and is fixedly attached to said metal frame.

5. A bicycle in accordance with claim 1 wherein said steerable front wheel assembly is rotatably engaged with said head tube and comprises a handlebar, a hollow handlebar stem fixedly attached to said handlebar, a tubular fork neck having two branches slidably, telescopically engaged with said handlebar stem, means for clamping together said fork neck and handlebar stem, a tubular metal fork fixedly attached to said fork neck, a front wheel having a fixed axle, a pair of tubular metal sleeves, each of said sleeves being bearing-mounted to said axle on opposite sides of said front wheel, each of said sleeves slideably, telescopically engaging one of said fork branches, and means for fixing said sleeves to said branches.

6. A bicycle in accordance with claim 5 wherein a fork cover flange is fixedly attached to the fork neck and a curved, concave front fender of arcuate cross-section extends from about 1 to 1½ quadrants above the axle of the front wheel and is fixedly attached to the fork cover flange and extends about equally to the front and rear of the fork cover flange.

7. A frame assembly for a miniature bicycle of a size suitable for children 1½ to 3 years old comprising: (A) an integral, tubular metal member having (i) a midsection in the form of a unitary goose-neck shaped body tube, said goose-neck shaped body tube having an upwardly extending rear portion, an inclined forward portion and a bow-shaped midportion intermediate said rear and forward portions; (ii) a rear section in the form of a metal tube bent in double to provide (a) a first "U"-shaped bend extending in a first plane, and bent again to provide (b) a second and a third "U"-shaped bend extending in two separate substantially parallel planes which are substantially perpendicular to said first plane and (c) a pair of generally parallel terminal portions, each of said terminal portions being shaped to conform to the periphery of the bow-shaped portion of said integral tubular, metal member and fixedly attached thereto by brazing or welding and said first "U"-shaped bend being positioned adjacent the upwardly extending rear portion of said body tube and being affixed thereto by brazing or welding (iii) a forward section in the form of a metal head tube being fixedly attached to said body tube by brazing or welding.

8. A frame assembly in accordance with claim 7 wherein a "U"-shaped metal tube is fixedly attached to the rear section of the metal frame above the first "U"-shaped bend extending opposite thereto and at an upward angle therewith.

9. A frame assembly in accordance with claim 7 wherein the rear portion of said midsection is substantially vertical and the inclined forward portion is deformed slightly upward at about its midposition to haave a generally "C"-shape which curves oppositely to the intermediate bow-shaped section.

10. A miniature bicycle of a size suitable for children 1½ to 3 years old comprising: (A) an integral, tubular metal frame having (i) a midsection in the form of a unitary goose-neck shaped body tube, said goose-neck shaped body tube having an upwardly extending rear portion, an inclined forward portion and a bow-shaped midportion intermediate said rear and forward portions; (ii) a rear section in the form of a metal tube bent in double to provide (a) a first "U"-shaped bend extending in a first plane, and bent again to provide (b) a second and a third "U"-shaped bend extending in two separate substantially parallel planes which are substantially perpendicular to said first plane and (c) a pair of generally parallel terminal portions, each of said terminal portions being shaped to conform to the periphery of the bow-shaped portion of said integral tubular, metal frame and fixedly attached thereto by brazing or welding, and said first "U"-shaped bend being positioned adjacent the upwardly extending rear portion of said body tube and being affixed thereto by brazing or welding (iii) a forward section in the form of a metal head tube being fixedly attached to said body tube by brazing or welding, said forward section being engaged to (B) a steerable front wheel assembly rotatably engaged with said head tube, said steerable assembly comprising (i) a handle bar connected to a handle bar stem (ii) a front wheel having an axle rotatably coupled to said handle bar stem and fixedly attached to pedal arms to enable front wheel drive, said rear section of said metal frame being engaged to (C)(i) a seat post slidably engaged with said upwardly extending rear portion of said body tube (ii) clamping means to fixedly attach said seat post to said rear portion of said goose-neck shaped body tube; (D) said rear section of said metal frame being engaged to a rear wheel assembly comprising (i) a pair of training wheel metal brackets, each of said brackets being fixedly engaged to opposite sides of the rear section of the metal frame (ii) a pair of training wheels, each of said wheels being rotatably engaged to an opposite bracket (iii) a rear wheel having an axle rotatably engaged to said rear section, and (E) a "U"-shaped metal tube fixedly attached to the rear section of the metal frame above the first "U"-shaped bend extending opposite thereto and at an upward angle therewith to provide means for carrying packages or for pushing the bicycle.

* * * * *